INVENTOR
Carl H. Becker
BY
Fleh and Swain
ATTORNEYS

Sept. 24, 1957 C. H. BECKER 2,807,675
STEREOPHONIC SOUND METHOD AND APPARATUS
Filed June 29, 1953 2 Sheets-Sheet 2

INVENTOR
Carl H. Becker
BY
Flehr & Swain
ATTORNEYS

United States Patent Office 2,807,675

Patented Sept. 24, 1957

2,807,675

STEREOPHONIC SOUND METHOD AND APPARATUS

Carl H. Becker, Los Altos, Calif., assignor to Ampex Electric Corporation, Redwood City, Calif., a corporation of California Application June 29, 1953, Serial No. 364,562

5 Claims. (Cl. 179—100.1)

This invention relates generally to stereophonic systems and methods such as are suitable for the recordation and reproduction of sound.

As disclosed in my copending applications filed of even date herewith, Serial No. 364,785, now Patent No. 2,783,677, and Serial No. 364,561, various methods can be used for recording sound stereophonically. During the filming of moving pictures it is desirable to record certain sounds stereophonically and in synchronism with the film, as for example the speaking voices of actors. Such a master sound record may be supplemented with additional pre-scored sounds or sound effects to form a final composite sound record which is reproduced at the time the film is projected. With present day methods and techniques there is a lack of flexibility which can be exercised in preparing the final record, and in particular it is not possible in the process of forming the final record to modify directivity effects over a substantial distance in azimuth, either to the left or to the right.

In general it is an object of the present invention to provide a system and method which facilitates the preparation of a final composite stereophonic record with desired directivity, in which directivity may vary over a wide range from that of the original master record.

Another object of the invention is to provide a system and method of the above character which makes possible the addition of pre-scored sounds and sound effects with the master record, with full control over directivity, and which therefore makes possible the preparation of a final composite record which can be reproduced with utmost realism and desired psychological effects.

Another object of the invention is to provide a novel system and method for the preparation of composite stereophonic records which will enable an utmost amount of monitoring and control with respect to directivity of all the sound and sound effects, and also monitoring with respect to their relative intensities and the general volume level.

Additional objects and features of the invention will appear from the following description in which the preferred embodiment of the invention has been set forth in detail in conjunction with the accompanying drawing.

Referring to the drawing.

In general my invention utilizes multichannel stereophonic recording of acoustical events by the use of a plurality of microphones spaced horizontally over or adjacent the staging area where the acoustical events originate, together with suitable multichannel recording means, such as a multichannel amplifying means and a magnetic tape recorder. Assuming that images are being filmed simultaneously with recording sound, the tape recorder is driven synchronously with the camera. As disclosed in said copending applications it is desirable to distribute the microphones whereby they are spaced in azimuth by substantially equal angles. In a typical instance six microphones can be used with six channels being recorded upon the magnetic tape. The sounds recorded in this fashion may be the voices of actors which require close synchronization with the moving picture film. During the making of such a record the directivity may be shifted to the left or to the right, by use of the azimuth control means disclosed in said application, Serial No. 364,561.

In addition to the sounds recorded in conjunction with filming it is generally desirable for the final record to contain additional recorded sounds. Such sounds are pre-scored by recording upon a suitable record medium, such as a magnetic tape. The supplemental sounds may include, for example, orchestration, solo parts of a musical selection, and special sound effects. Some of these sounds, particularly orchestration and solo parts of musical selections, are preferably recorded stereophonically.

When all of the additional sounds have been pre-scored, I reproduce through apparatus, such as will be presently described, with formation of a final multichannel stereophonic record. Means is provided in this apparatus whereby the master recording, and likewise the pre-scored recordings, can be monitored and shifted as to directivity, thereby producing a desired directivity in the final record for all of the recorded sounds and sound effects.

Figure 1:
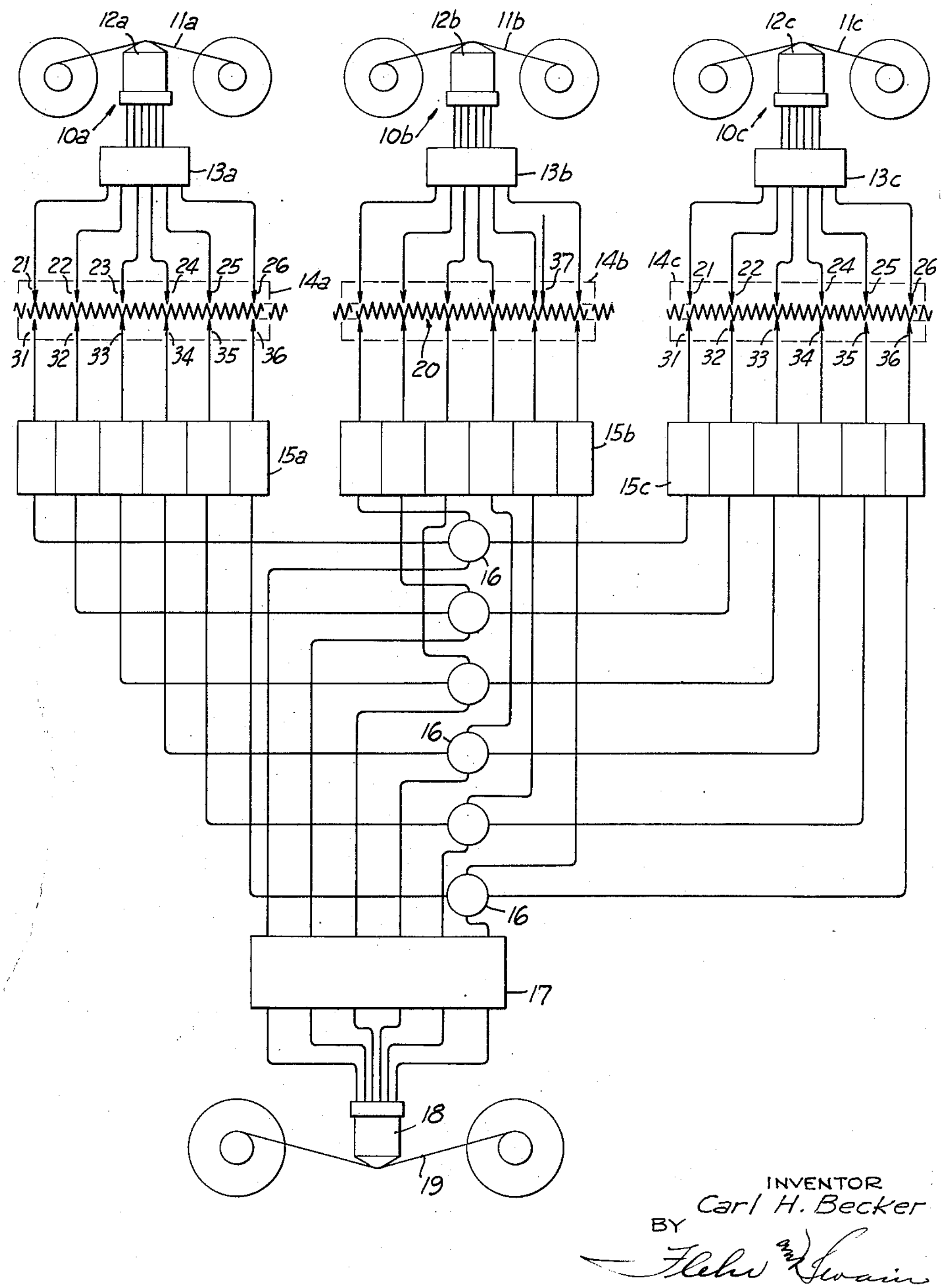
Figure 1 is a schematic diagram showing a system for carrying out the present invention.

My system and method can be better understood after a description of Figure 1. Devices 10*a*, 10*b*, and 10*c* represent magnetic tape reproducing machines of conventional type, capable of translating the records on the magnetic tapes 11*a*, 11*b*, and 11*c* to provide corresponding electrical currents in separate network circuits. It is assumed that the magnetic tapes 11*b* and 11*c* may for example carry pre-scored orchestration and vocal parts respectively. One or more additional records may be provided for other pre-scored sounds or sound effects. It is assumed that the record 11*a* is made stereophonically in the manner described in said copending application, Serial No. 364,561 with six recorded channels. The lines extending from the magnetic head 12*a* represent the six circuits in which currents are induced corresponding to the reproduced channels.

The outputs of the magnetic head 12*a* are shown connected to the pre-amplifier 13*a*, which can be of the multichannel type, capable of amplifying the several channels separately. The output of this amplifier is connected to the azimuth control device 14*a*, which makes possible shifts in directivity as will be presently explained. The azimuth control device 14*a* connects with the attenuating means 15*a*, which preferably includes separately adjustable attenuating devices for each of the channels, together with a convenient gang control.

The magnetic reproducer 10*b* is similarly connected to the pre-amplifier 13*b*, the azimuth control device 14*b*, and the attenuating means 15*b*. Reproducing device 10*c* similarly connects with the pre-amplifier 13*c*, azimuth control device 14*c*, and attenuating means 15*c*.

The corresponding channels extending from the attenuators 15*a*, 15*b*, and 15*c* are combined by the mixing devices 16, to provide six composite channels. The six channels are then amplified by the multichannel amplifying means 17, and the separate outputs of this amplifier means connected to the multichannel recording head 18, to form the final magnetic tape record 19. While it is desirable to use magnetic recording to provide the final record, it will be appreciated that other methods of recording can be used to form the final record, as for example multichannel photographic recording upon a film.

The pre-amplifiers 13*a*–13*c* are desirable for impedance matching but may be omitted.

Each of the azimuth control devices can consist of a resistor which is provided with a plurality of taps or spaced points 21 to 26 inclusive, connected to the outputs of the preamplifier 13*a*. Another series of spaced taps 31 to 36 inclusive connects to the several inputs of the attenuating means. Normally the taps or points of connection 21 to 26 inclusive are equally spaced, to provide equal values of resistance between them. These values of resistance are sufficient to minimize cross-talk between channels. Suitable means is provided for shifting either one of the two sets of taps to the left or to the right. Assuming that the taps 31 to 36 are shifted it will be apparent that when these taps are shifted to the left for a distance corresponding to the spacing between taps, then taps 21 to 25 will make direct connection with taps 32 to 36 inclusive. This has the effect of shifting the apparent directivity of the sound source as originally recorded by an azimuth angle corresponding to the azimuth angles between pickup microphones. The shift is toward the left or toward the right, depending on the direction of movement. The same applies to the control devices 14*b* and 14*c*, and any additional control devices which may be employed.

Use of the apparatus shown in Figure 1 is as follows: It is assumed that the record on the magnetic tape 10*a* has been made stereophonically, as for example by the system and method disclosed in my aforesaid copending application, Serial No. 364,561.

Also assuming that six channels have been used in making this record it will be evident that the relationship of the various channels is fixed upon tape. If one were to reproduce this multichannel record through loud speakers disposed about an auditorium area in a manner comparable to the positioning of the original microphones, the stereophonic effect would be of a predetermined character, and would depend upon the time and phase relationship of the sounds as originally recorded. By means of the multichannel magnetic head 12*a*, the various recorded channels are translated into corresponding current variations, and these current variations are applied to the taps or points of connection 21 to 26 inclusive. Assuming that the taps 21 to 36 are aligned with points of connection 21 to 26 in the manner illustrated in Figure 1, then the current variations for the separate channels are applied to the attenuator 15*a* and then through the mixers 16 to the amplifying means 17. Amplified currents are then applied to the multichannel magnetic head 18, and recorded upon the tape 19. In preliminary playback of the magnetic tape 11*a*, it may have been noted that changes in the apparent directivity of the sound would be advisable at various points, and that shifts in apparent directivity through specified angles should be made in preparing the final record. In addition it may have been noted that at various points in the record changes would be desirable in the relative intensity between the different channels, or that changes in volume level should be made with respect to all of the channels. Now, as the record 10*a* is being played back through the system in Figure 1, the operator takes into account all of these previously noted required changes, and when a change in directivity is desired, the taps 31 to 36 inclusive are moved to the left or to the right to effect a corresponding shift in directivity to the extent desired. The shift can be made through an angle as great as 180° or even 360° depending upon the positioning of the original microphones. At the same time the individual units of the attenuator 15*a* can be adjusted to change the volume or intensity of one channel with respect to the others. Likewise general changes in volume level can be made by adjusting the gang control of the attenuator. As a net result of the type of monitoring just described, the sound is recorded upon the tape 19 in six composite channels, but the recorded sounds are now modified with respect to directivity, relative intensity and volume level.

Assuming that only voice or dialogue has been recorded upon the record 10*a*, it is generally desirable to incorporate additional sounds and sound effects in the final record. Assuming, for example, that an orchestration is desired, the music is recorded stereophonically as a separate operation on say the tape 11*b*, taking care to effect a general synchronization with respect to the record 11*a* and the film. At the same time that the record 11*a* is played through the system of Figure 1, one plays the record 11*b* synchronously with the record 11*a*, and the monitor follows prescribed instructions with respect to modifying directivity by control of device 14*b*, and with respect to general intensity and volume level by making changes in attenuator 15*b*. Pre-scored orchestration is thus recorded upon the tape 19, together with the dialogue. Record 11*c* can similarly contain solo parts recorded stereophonically, and this record is likewise played back in conjunction with playing of records 11*a* and 11*b*, and the directivity and general intensity in volume level modified accordingly. One or more additional previously made or pre-scored records can be played back through the system by the provision of additional azimuth control and attenuator units to effect any desired combination of sounds in the final record. Some of these sounds may not be recorded stereophonically, but may comprise special effects such as thunder and the like. The effect of motion or directivity can be imparted to such non-stereophonic sounds by applying the same to one or more taps 37 which can be moved as desired.

The final record 19 may be reproduced through loud speakers synchronously with projection of the moving picture film. In many instances, however, it will be desirable to transpose the record 19 to the moving picture film, either photographically or magnetically.

Figure 2:
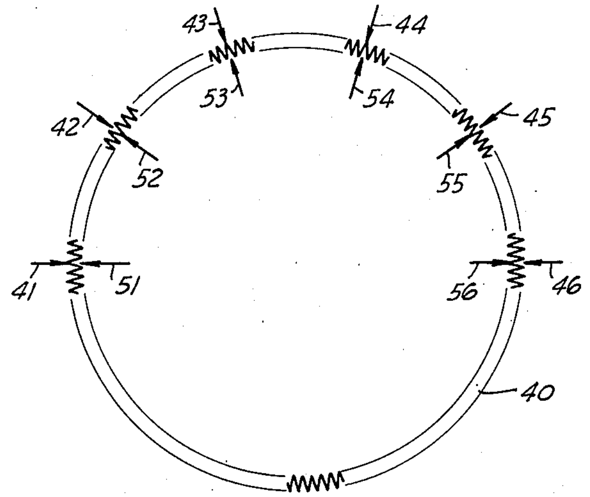
Figure 2 is a detail showing modified means for azimuth control.
Figure 3:
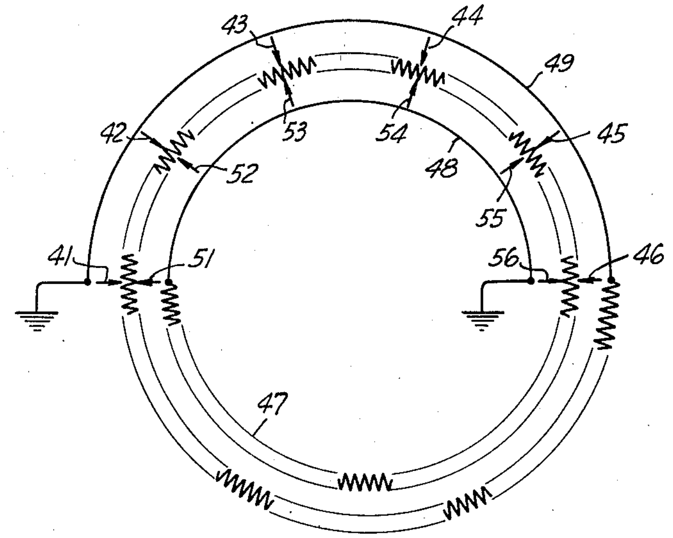
Figure 3 is a detail showing another means for azimuth control.

Figures 2 and 3 illustrate other ways in which the azimuth control devices can be made. In Figure 2 the resistor 40 corresponds to the resistor 20 of Figure 1, and is in the form of a continuous ring. Contacts or points of connection 41 to 46 correspond with points 21 to 26, and contacts 51 to 56 correspond with the taps or contacts 31 to 36. By turning the taps or contacts 51 to 56, while maintaining the spacing between them constant, a change in the angle of directivity can be made to the extent desired, in the same manner as described with respect to Figure 1.

Figure 3 shows a spiral arrangement in which the resistor 47 corresponds to the resistors 20 and 40 of Figures 1 and 2. The ends of this resistor are connected to the grounded conductors 48 and 49, which are extended for making engagement with the various contacts. The points of connection 41 to 46 can be distributed as illustrated, and the taps 51 to 56 can be arranged for rotation to the left or to the right. With this arrangement rotation to the left or to the right gradually grounds the advancing contacts and in extreme positions some of the contacts may be grounded by engagement with the grounded conductors 48 and 49.

It will be evident that my system and method greatly enhances and facilitates the production of satisfactory stereophonic records for use in connection with moving picture films, as for example films of the three dimension type. The various adjustments and modifications made possible by the system as shown in Figure 1 makes it possible to prepare a final record having utmost effectiveness with respect to sound directivity and intensity and it greatly facilitates the preparation of composite records by the use of pre-scored stereophonic sound. Also it facilitates the addition of non-stereophonic sound effects with directivity or movement.

My complete method can be reviewed as follows: A stereophonic multichannel record is made from the pickups of several microphones distributed over or adjacent a staging area, in conjunction with and in synchronism with moving picture filming. This sound record is analyzed by preliminary playback to determine what modifications are required, particularly with respect to directivity and also with respect to relative sound intensities and general volume level. Before making the final record, at least one and usually several additional records are made stereophonically, containing sound and sound effects which one desires to incorporate in the final record. In making these additional pre-scored records care is taken to maintain general synchronization with respect to the picture filmed. These prescored records are likewise carefully analyzed to determine any changes desired in directivity, and possible changes in relative intensity between channels and general volume level. The original master record, together with the pre-scored records, are now translated or played back in cynchronism, through the apparatus of Figure 1, The desired changes in directivity are now made with respect to the master record and pre-scored records, and likewise desired changes are made with respect to the relative intensity between channels, and the general volume level. All of these changes are now incorporated in the final record, whereby the final record is suitable for playback in synchronism with the original moving picture film or recopied on other suitable records such as separate magnetic tapes or photographically or magnetically upon the moving picture film. In addition to the pre-scored stereophonic sound and sound effects which may be incorporated through the system of Figure 1, one or more non-stereophonic sound effects can be incorporated by providing a special tap for this purpose in any one of the azimuth control devices, the tap being movable whereby the special sound effect can be supplied with movement or directivity.

For auditorium reproduction of the final record in conjunction with the original film, the loud speakers can be disposed in a manner disclosed in my aforementioned copending application, Serial No. 364,561 to enable optimum realism.

I claim:

1. In a system of the character described, means for translating a multichannel stereophonic sound record whereby currents are formed representing the several sound channels, azimuth control means for shifting the application of the currents of the transcribed channels to change the apparent directivity of the stereophonic effect, and means for re-recording the separate currents forming a multichannel sound record.

2. A system as in claim 1 together with attenuator means for adjusting the relative intensity of one channel with respect to another, and for increasing or decreasing the volume level of all of the said channels.

3. A system as in claim 1 in which said azimuth control means comprises an extended resistor having a plurality of spaced points on the same connected to receive the translated currents, and having a plurality of movable contacts on the same serving to receive the currents for re-recording, said last named contacts being shiftable relative to the points of connection to shift the apparent directivity.

4. In a system of the character described a means for translating multichannel stereophonic sound recordings whereby currents are formed representing the several sound channels of each of said recordings, azimuth control means associated with each of said recordings for shifting the application of the currents of the transcribed channels to change the apparent directivity of the stereophonic effect of each of said recordings, means for combining the currents of the channels associated with each of said recordings, and means for re-recording the currents to form a single multichannel sound record.

5. A system as in claim 4 in which said azimuth control means comprise extended resistors having plurality of spaced points on the same connected to receive the translated currents, and having plurality of movable contacts on the same serving to receive the currents for re-recording, said last named contacts being shiftable relative to the points of connection to thereby shift the apparent directivity.

References Cited in the file of this patent

UNITED STATES PATENTS

| | | |
|---|---|---|
| 2,247,554 | Garity et al. | July 1, 1941 |
| 2,499,603 | Mueller | Mar. 7, 1950 |
| 2,668,880 | Friess | Feb. 9, 1954 |